(12) United States Patent
Huang et al.

(10) Patent No.: US 8,228,639 B2
(45) Date of Patent: Jul. 24, 2012

(54) SYMMETRICALLY TAPERED CONSTRAINED LAYER DAMPER FOR A FLEX CABLE ASSEMBLY FOR A HARD DISK DRIVE

(75) Inventors: Fu-Ying Huang, San Jose, CA (US); Jr-Yi Shen, Sunnyvale, CA (US); Jifang Tian, Fremont, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1028 days.

(21) Appl. No.: 12/183,845

(22) Filed: Jul. 31, 2008

(65) Prior Publication Data

US 2010/0027165 A1 Feb. 4, 2010

(51) Int. Cl.
*G11B 5/55* (2006.01)
(52) U.S. Cl. .................................. 360/264.2
(58) Field of Classification Search ............. 360/264.2
See application file for complete search history.

(56) References Cited

U.S. PATENT DOCUMENTS

| | | | |
|---|---|---|---|
| 5,907,452 A * | 5/1999 | Kan | 360/99.16 |
| 6,937,442 B2 | 8/2005 | Zhao et al. | |
| 7,095,595 B2 | 8/2006 | Shin | |
| 7,116,522 B2 | 10/2006 | Poorman | |
| 7,271,345 B2 | 9/2007 | Freeman et al. | |
| 7,495,866 B2 * | 2/2009 | Izumi et al. | 360/264.2 |
| 7,649,718 B1 * | 1/2010 | Edwards | 360/264.2 |
| 7,903,377 B2 * | 3/2011 | Huang et al. | 360/264.2 |
| 8,045,297 B2 * | 10/2011 | Contreras et al. | 360/245.9 |
| 8,116,040 B2 * | 2/2012 | Ng et al. | 360/256 |
| 2003/0235012 A1 * | 12/2003 | Nishizawa | 360/264.2 |
| 2004/0264058 A1 | 12/2004 | Huynh | |
| 2009/0141404 A1 * | 6/2009 | Kerner et al. | 360/245.8 |
| 2010/0027165 A1 * | 2/2010 | Huang et al. | 360/264 |
| 2010/0085665 A1 * | 4/2010 | Macpherson | 360/264.2 |

FOREIGN PATENT DOCUMENTS

| | | |
|---|---|---|
| JP | 08287625 | 11/1996 |
| JP | 10134529 | 5/1998 |
| JP | 2004110937 | 4/2004 |

OTHER PUBLICATIONS

Chang, Jen-Yuan "Hard Disk Drive Seek-Arrival Vibration Reduction with Parametric Damped Flexible Printed Circuits", *Springer Link; Microsystem Technologies*; vol. 13, No. 8-10, (May 2007), 1103-1106.

* cited by examiner

*Primary Examiner* — Angel A. Castro (57) ABSTRACT

A flex cable assembly for a head stack assembly of a hard disk drive comprises a flex cable for conducting data signals from the head stack assembly to a connector. The flex cable has a dynamic loop section between a termination for the head stack assembly and the connector. The flex cable has a constrained layer damper for attenuating random transient vibration. The constrained layer damper has a symmetrically tapered shape for reducing stress concentration and is coupled with the dynamic loop section of the flex cable adjacent to an area of the flex cable configured for receiving a coupler for coupling the flex cable assembly with the head stack assembly.

18 Claims, 5 Drawing Sheets

```
┌─────────────────────────────┐
│ Provide a flex cable for    │
│ conducting data signals     │
│ from an HSA to a            │
│ connector                   │
│ 510                         │
└─────────────────────────────┘
              │
              ▼
┌───────────────────────────────────────────────────────────┐
│ Couple a CLD having a symmetrically tapered shape adjacent│
│ to an area of the flex cable to be coupled to the HAS, and│
│ extending into a dynamic loop section                     │
│ 520                                                       │
│  ┌──────────────────┐   ┌──────────────────────┐         │
│  │ Adhesively       │   │ Press a surface of a │         │
│  │ couple the CLD   │   │ viscoelastic damping │         │
│  │ to the flex cable│   │ layer onto the flex  │         │
│  │ 522              │   │ cable                │         │
│  │                  │   │ 524                  │         │
│  └──────────────────┘   └──────────────────────┘         │
└───────────────────────────────────────────────────────────┘
              │
              ▼
┌─────────────────────────────┐
│ Couple the flex cable       │
│ and CLD with the HSA        │
│ 530                         │
└─────────────────────────────┘
              │
              ▼
┌─────────────────────────────┐
│ Assemble the flex           │
│ cable into an HDD           │
│ 540                         │
│  ┌───────────────────────┐  │
│  │ Form a dynamic        │  │
│  │ loop directed         │  │
│  │ toward a              │  │
│  │ termination of        │  │
│  │ the HAS               │  │
│  │ 545                   │  │
│  └───────────────────────┘  │
└─────────────────────────────┘
```

FIG. 5

SYMMETRICALLY TAPERED CONSTRAINED LAYER DAMPER FOR A FLEX CABLE ASSEMBLY FOR A HARD DISK DRIVE

TECHNICAL FIELD

This invention relates generally to the field of direct access storage devices and in particular to controlling the vibration and fatigue of a flex cable in a hard disk drive.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Vibration can limit the performance of an HDD, and if uncontrolled can render an HDD inoperable. Various methods and systems for controlling vibration are well known in the art. These can range from vibration absorbent materials to extraneous systems such as shock absorbers and active vibration controls systems with feedback loops. When considering a method for controlling vibration, size, cost, and compatibility with the operating environment need to be considered. These considerations become particularly challenging in HDD technology.

Mitigating vibration in an HDD will allow an HDD to write more data tracks on a disk surface. Controlling vibration in an HDD will also allow the subassemblies in an HDD to settle on these data tracks more quickly and allow faster writing and retrieval of data.

SUMMARY OF THE INVENTION

Various embodiments of the present invention are described herein. A flex cable assembly for a head stack assembly of a hard disk drive comprises a flex cable for conducting data signals from the head stack assembly to a connector. The flex cable has a dynamic loop section between a termination for the head stack assembly and the connector. The flex cable has a constrained layer damper for attenuating random transient vibration. The constrained layer damper has a symmetrically tapered shape for reducing stress concentration and is coupled with the dynamic loop section of the flex cable adjacent to an area of the flex cable configured for receiving a coupler for coupling the flex cable assembly with the head stack assembly.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

Flex circuits are widely used in a number of industries and products. They can be found in heart pacemakers for connecting electronic subassemblies, to robotic arms for enabling electrical coupling of components across a moveable joint. They can be found in everyday devices such as flip-up cell phones, CD players, printers and computers. Embodiments of the present invention improve the fatigue life of a flex circuit regardless of the device in which it is used. For the sake of brevity and clarity, embodiments of the present invention will be described as being applied in a computer Hard Disk Drive (HDD). A flex circuit is known as a flex cable within the HDD industry and from hereon will be referred to as a flex cable.

Reliability is a major concern for users of HDDs since users are trusting large amounts of data, personal information, and in some instances, the viability of their business to the continued performance of an HDD. To meet these expectations, HDD designers strive to design components and subassemblies in the HDD to function for long periods of time without failure.

A device within the HDD, known as an actuator, moves a magnetic transducer rapidly across a disk surface during operation. A flex cable enables data to be transferred between the actuator and a PC card while the actuator is moving the magnetic transducer across the disk surface. The conductors within the flex cable are commonly known as traces. The flex cable can experience fatigue cracks in its traces during operation. The flex cable and its traces need to be properly designed and manufactured to withstand the hundreds of millions of flex cycles it can experience during the operating life of the HDD in which it is used.

The discussion will begin with a brief overview of an HDD which comprises a flex cable for communicatively coupling a head stack assembly to a printed circuit board, and conditions in which a fatigue crack can develop in a signal trace of the flex cable. The discussion will then focus on embodiments of the present invention by which an occurrence of a fatigue crack can be reduced in a flex cable. The implementation of embodiments of the present invention will then be discussed.

Overview

Figure 1:
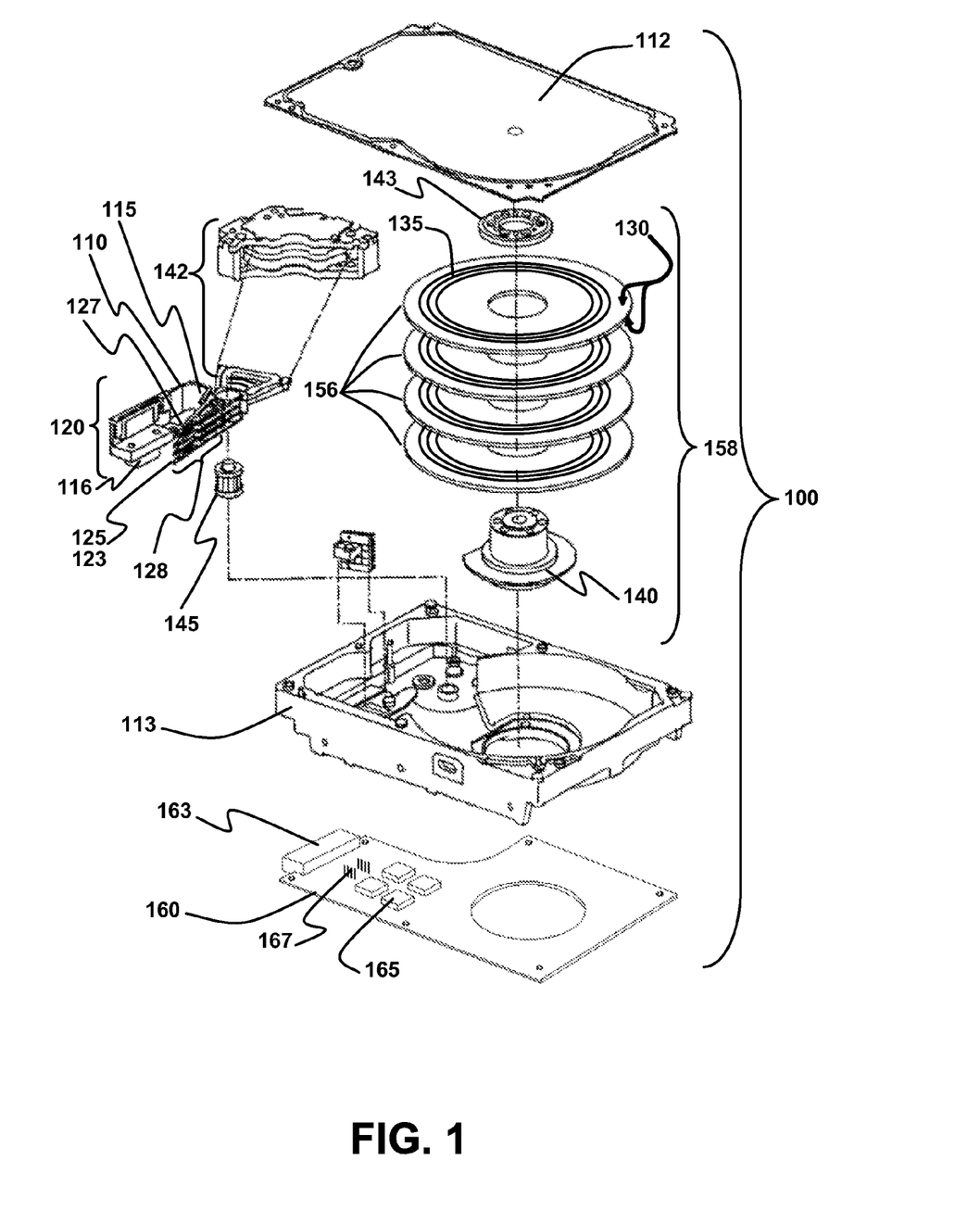
FIG. 1 is an isometric blow-apart of an HDD in accordance with one embodiment of the present invention.

With reference to FIG. 1, an isometric blow-apart of HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. Hard disk drive slider 125 comprises magnetic transducer 123 which reads and writes data to and from data tracks 135. Suspension 127 and hard disk drive slider 125 comprise head gimbal assembly (HGA) 128. Flex cable 110, which is part of HSA 120, conveys data between HSA connector 116 and arm electronics (A/E) module 115. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

Figure 2:
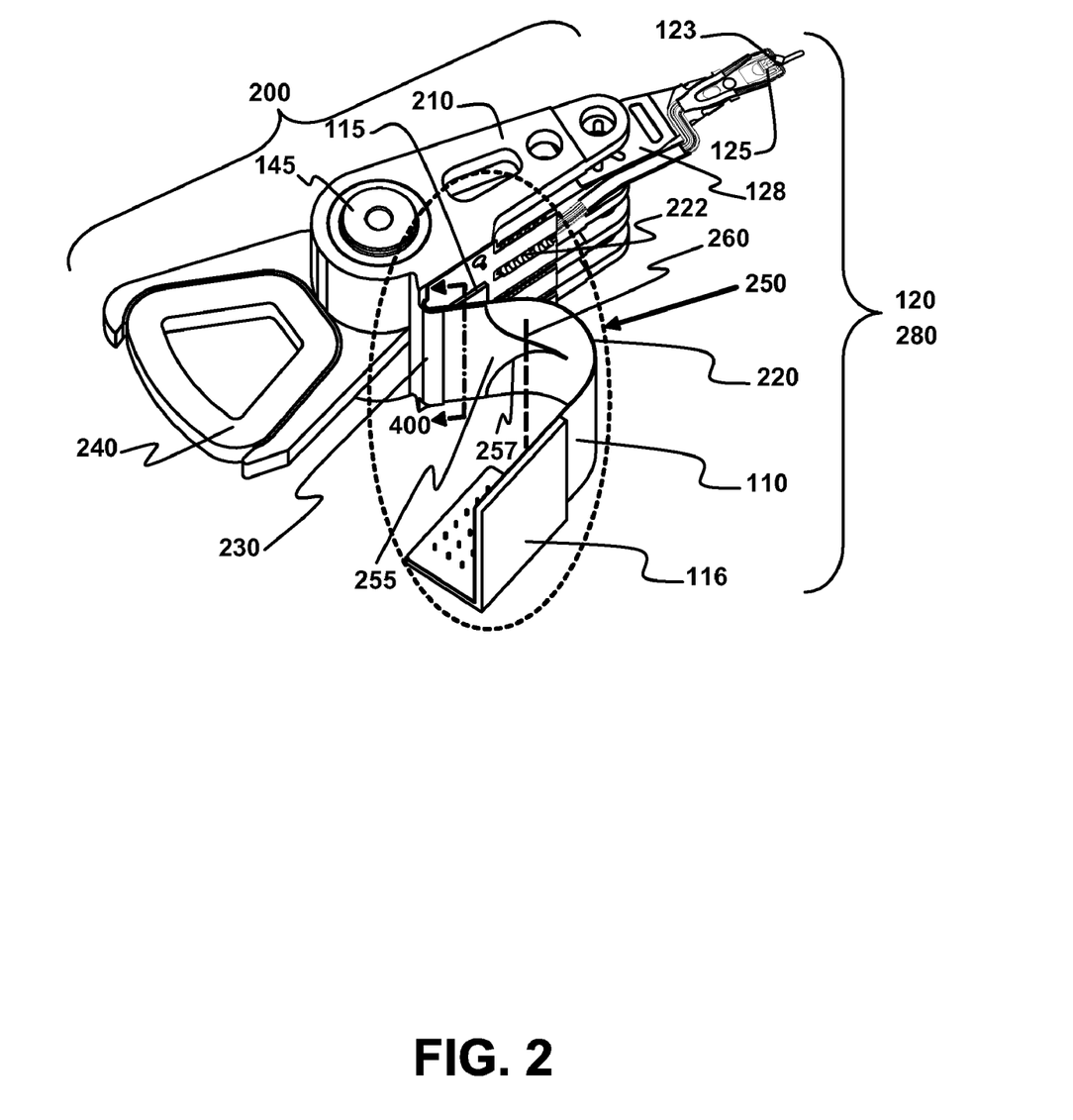
FIG. 2 is an isometric of an actuator in accordance with one embodiment of the present invention.

With reference to FIG. 2, and in accordance with embodiments of the present invention, the hierarchy of subassemblies and assemblies is defined as follows: Flex cable assembly 250 is a subassembly which can be coupled with comb 210. In general, flex cable assembly 250 comprises flex cable 110 for conducting data signals from HSA 120 to HSA connector 116. Flex cable 110 is a component to which other components can be added, such as A/E module 115, HSA connector 116, constrained layer damper (CLD) 255, and coupler 230, wherein assembled comprises flex cable assembly 250. Comb assembly 200 is a subassembly which is operable to receiving at least one HGA 128. In general, comb assembly 200 comprises, comb 210, voice coil 240, and flex cable assembly 250. Coupling at least one HGA 128 with comb assembly 200 comprises HSA 120. Coupling pivot bearing 145 with HSA 120 comprises actuator 280.

Components can be interchanged or shared between subassemblies while maintaining the spirit of the definitions of the aforementioned assemblies and subassemblies. Embodiments of the present invention, and as presented in FIG. 2, are applicable to the aforementioned assemblies and subassemblies as well as HDD 100 in which flex cable 110 is a component.

Flex cable 110 conveys data between A/E module 115 and HSA connector 116 while allowing actuator 280 to arcuately move magnetic transducer 123 across disk surface 130 and access data tracks 135. During a normal life of HDD 100, flex cable 110 can undergo hundreds of millions of flex cycles. It is expected by users and designers of HDD 100 for flex cable 110 to flex and convey data between A/E module 115 and HSA connector 116 reliably and without failure.

Physical Description

With continued reference to FIG. 2, HSA 120 is presented in accordance with an embodiment of the present invention. Comb assembly 200, when coupled with HSA 120 and pivot bearing 145, is operable to arcuately moving magnetic transducer 123 across data tracks 135 in HDD 100. Comb assembly 200 comprises flex cable assembly 250, wherein flex cable assembly 250 has flex cable 110 and CLD 255. Flex cable 110 conducts data signals from HSA 120 to HSA connector 116. Flex cable 110 comprises a dynamic loop section 220 between termination 222 for HSA 120 and HSA connector 116. CLD 255 is attached to dynamic loop section 220 of flex cable 110 and attached adjacently to an area of flex cable 110 configured for receiving coupler 230.

Figure 3:
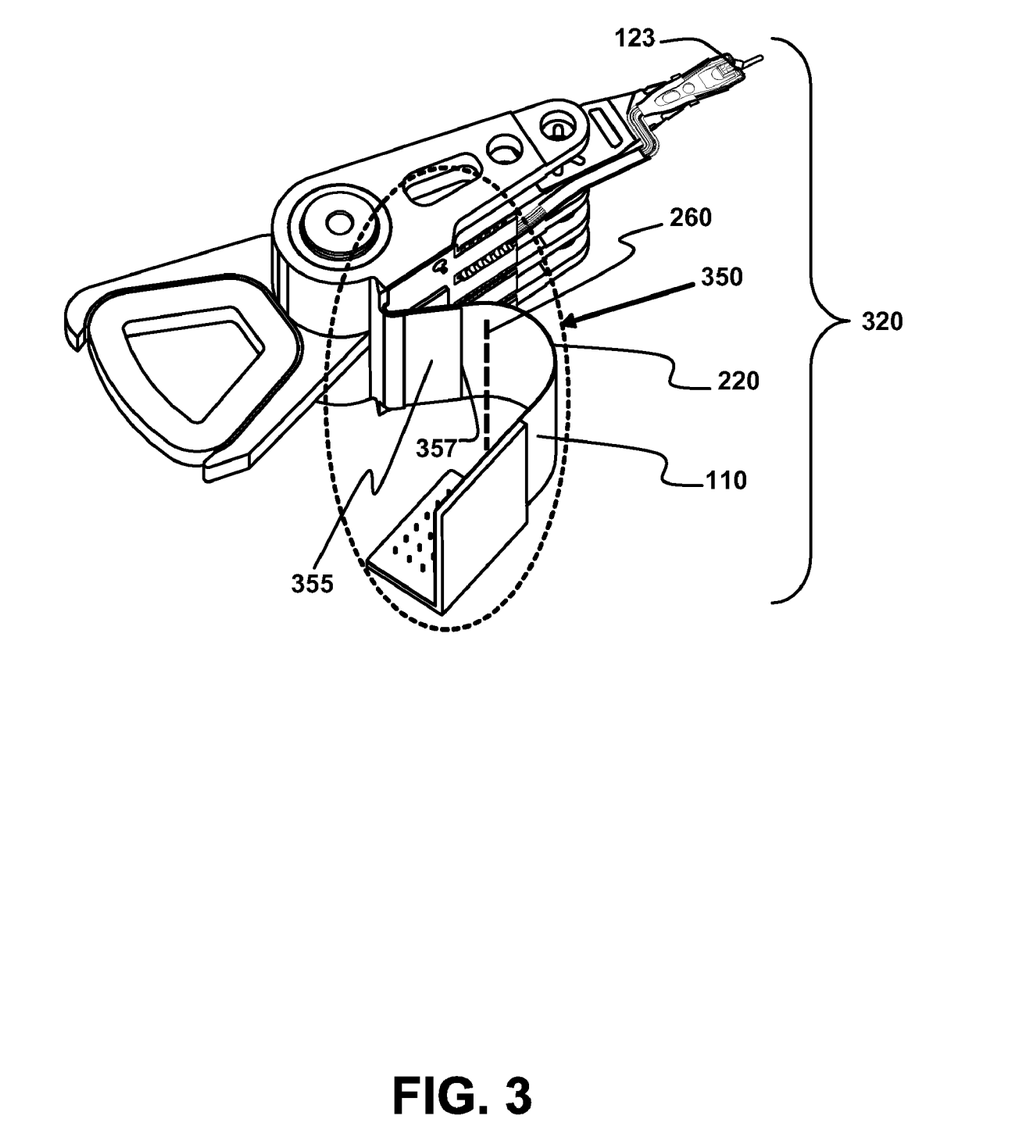
FIG. 3 is an isometric of an actuator operable to embodiments of the present invention.

With reference to FIG. 3 an isometric of actuator 320 that is operable to embodiments of the present invention is presented. Vibration of flex cable 110 is a significant cause for delaying magnetic transducer 123 to settle on data track 135. It is appreciated that the use of a damper, such as CLD 355 is an effective method for reducing the gain of the frequency of vibration and attenuating random transient vibration due to flex cable 110. A consequence recently discovered of coupling CLD 355 with flex cable 110 is a discontinuity in the thickness of flex cable assembly 350 which results in a stress concentration in dynamic loop section 220.

Stress concentration is well known and understood by one of ordinary skill in the art. Briefly, stress concentration can be caused by an abrupt change in the topography and/or shape of an object, which will be subjected to deformation. A stress concentrator, such as an abrupt change in thickness is usually a concern since fatigue and cracking can occur in the vicinity of a stress concentrator when a flex cable is subjected to flexing.

The thickness of flex cable 110 abruptly increases at CLD edge 357. CLD edge 357 is parallel to axis 260 about which dynamic loop section 220 is formed. Experimentation has shown that after multiple flex cycles, the parallel orientation of CLD edge 357 with axis 260, can preferentially crack a trace of flex cable 110 in the vicinity of CLD edge 357. CLD edge 357 presents a stress concentrator for flex cable 110.

With reference to FIG. 2, and in accordance with an embodiment of the present invention, CLD 255 has a symmetrically tapered shape for reducing stress concentration. Reduction in stress concentration is accomplished by increasing the length and changing the shape of CLD edge 257, such that CLD edge 257 is skewed with respect to axis 260. It can be appreciated that compressive and tensile stresses that are created within flex cable 110 as it flexes are inherently oriented perpendicular to axis 260. CLD edge 257 intersects these stresses at varying locations, from minimum stress at the widest divergence of CLD edge 257 to maximum stress at the cusp of CLD edge 257. In so doing, stress of varying magnitude is distributed along CLD edge 257, thereby avoiding the concentration of stress such as that presented by CLD edge 357 of actuator 320 in FIG. 3.

In accordance with embodiments of the present invention, CLD 255 has a symmetrically tapered shape which reduces stress concentration by distributing a range of stresses magnitudes along CLD edge 257. In accordance with one embodiment of the present invention, CLD edge 257 is shaped by two parabolic sides meeting at a cusp. In accordance with another embodiment of the present invention, CLD edge 257 is shaped by two straight sides meeting at a cusp.

CLD 255 is coupled with flex cable 110 such that CLD 255 spans an area of flex cable 110 where, upon operation in HDD 100, there is relative motion between HSA 120 and dynamic loop section 220. A damper such as CLD 255 is designed to primarily reduce the gain of the frequency of vibration and attenuate random transient vibration.

Figure 4:
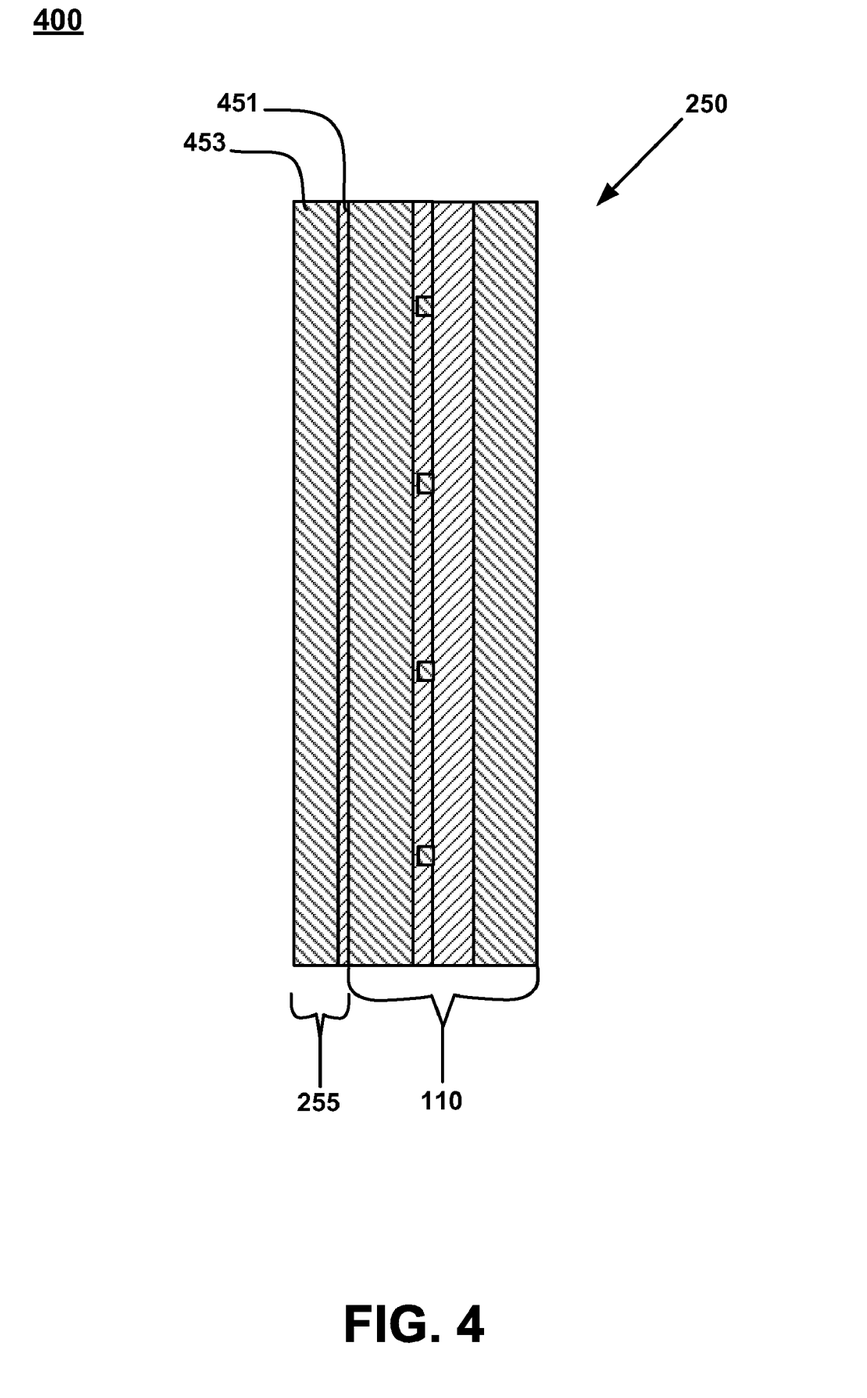
FIG. 4 is a cross section of a flex cable assembly for reducing random transient vibration in a hard disk drive in accordance with one embodiment of the present invention.

With reference to FIG. 2 and FIG. 4, cross section 400 of flex cable assembly 250 for reducing random transient vibration in a hard disk drive is presented in accordance with one embodiment of the present invention. Flex cable assembly 250 comprises CLD 255 and flex cable 110. CLD 255 comprises constraining layer 453 adhered to a first surface of a viscoelastic damping layer 451. Flex cable 110 is adhered to a second surface of viscoelastic damping layer 451. The surface of constraining layer 453 and the surface of flex cable 110 are adhered to parallel surfaces of viscoelastic damping layer 451. It can be appreciated that flex cable 110 comprises other components not discussed or identified here.

Constrained layer damping is well known and understood by one of ordinary skill in the art. In brief, CLD (255, 355) dampens vibration by cyclically deforming viscoelastic damping layer 451 that is covered on at least one surface by constraining layer 453 which is stiffer than viscoelastic damping layer 451. Constraining layer 453 constrains viscoelastic damping layer 451 as it is cyclically deformed by vibration and imparts strain into the viscoelastic damping layer 451. Viscoelastic damping layer 451 resists deformation and converts the strain energy into small amounts of heat.

In accordance with an embodiment of the present invention, CLD 255 comprises at least one constraining layer 453. The material for constraining layer 453 of CLD 255 is chosen from a group of plastics and metals that are known for their compatibility in the environment of HDD 100, for their manufacturability, and for their specific stiffness. Examples of metals in this group are stainless steel, aluminum, and high strength copper alloys such as Cu—Ni—Si—Mg, Be—Cu—Ni, and Cu—Ti. Examples of plastics in this group are: polyimide and polyester, commonly available from DuPont Corporation as KAPTON and MYLAR; and UPILEX, commonly available from Ube Industries.

In accordance with an embodiment of the present invention, CLD 255 comprises viscoelastic damping layer 451. Viscoelastic damping layer 451 is chosen from a group of materials that are characterized by a property known as lossiness. Lossiness is the characteristic of a material to attenuate oscillations or vibrations. Lossiness is a material's resistance to cyclic motion. As with constraining layer 453, compatibility in the environment of HDD 100 and manufacturability are considered when choosing a suitable viscoelastic damping material. Examples of materials that have desirable lossiness, compatibility with the HDD environment, and manufacturability are 3M Corporation's products ISD-110, ISD-120, and ISD-142; and Nitto Denko Corporation's LA-50/100. A characteristic of the above examples of viscoelastic damping materials is their ability to act as a pressure sensitive adhesive.

In the spirit of embodiments of the present invention, other configurations of CLD 255 are possible, such as multiple constraining layers separated by one or more viscoelastic damping layers. Such a multiple layered CLD can be coupled with flex cable 110 by a viscoelastic damping layer, which is a pressure sensitive adhesive. Such a multiple layered CLD can also be coupled with flex cable 110 by an adhesive, such as an epoxy adhesive or an acrylic adhesive.

Depending upon the design of HDD 100, when assembled into HDD 100, dynamic loop section 220 is directed either towards VCM 142, as presented in FIG. 1, or towards termination 222, as presented in FIG. 2.

In accordance with an embodiment of the present invention, coupler 230 for attaching flex cable 110 to HSA 120 comprises a curved device, which directs dynamic loop section 220 toward termination 222 of HSA 120. A coupler for attaching a flex cable assembly to an HSA is not limited to having a curved surface which directs dynamic loop section 220 toward termination 222 of HSA 120. As previously presented in FIG. 1, coupler 230 may have a surface that directs dynamic loop section 220 towards VCM 142.

In accordance with an embodiment of the present invention, and as presented in FIG. 2, coupler 230 by which flex cable assembly 250 can be coupled with HSA 120, is an integral part of comb 210. In accordance with another embodiment of the present invention, coupler 230 is coupled with comb 210 as a separate component of comb assembly 200. In accordance with another embodiment of the present invention, flex cable assembly 250 comprises coupler 230.

With reference to FIG. 2 and in accordance with an embodiment of the present invention, CLD 255 is coupled with a concave surface of dynamic loop section 220 of flex cable 110. In accordance with another embodiment of the present invention CLD 255 is coupled with a convex surface of dynamic loop section 220. The location of CLD 255 on the concave and convex sides of dynamic loop section 220 is determined by the HDD designer.

Operation

It is appreciated that the use of a damper, such as CLD 355 is an effective method for reducing the gain of the frequency of vibration and attenuating random transient vibration due to flex cable 110. A consequence recently discovered of coupling CLD 355 with flex cable 110 is a discontinuity in the thickness of flex cable assembly 350 which results in a stress concentration in dynamic loop section 220.

Figure 5:
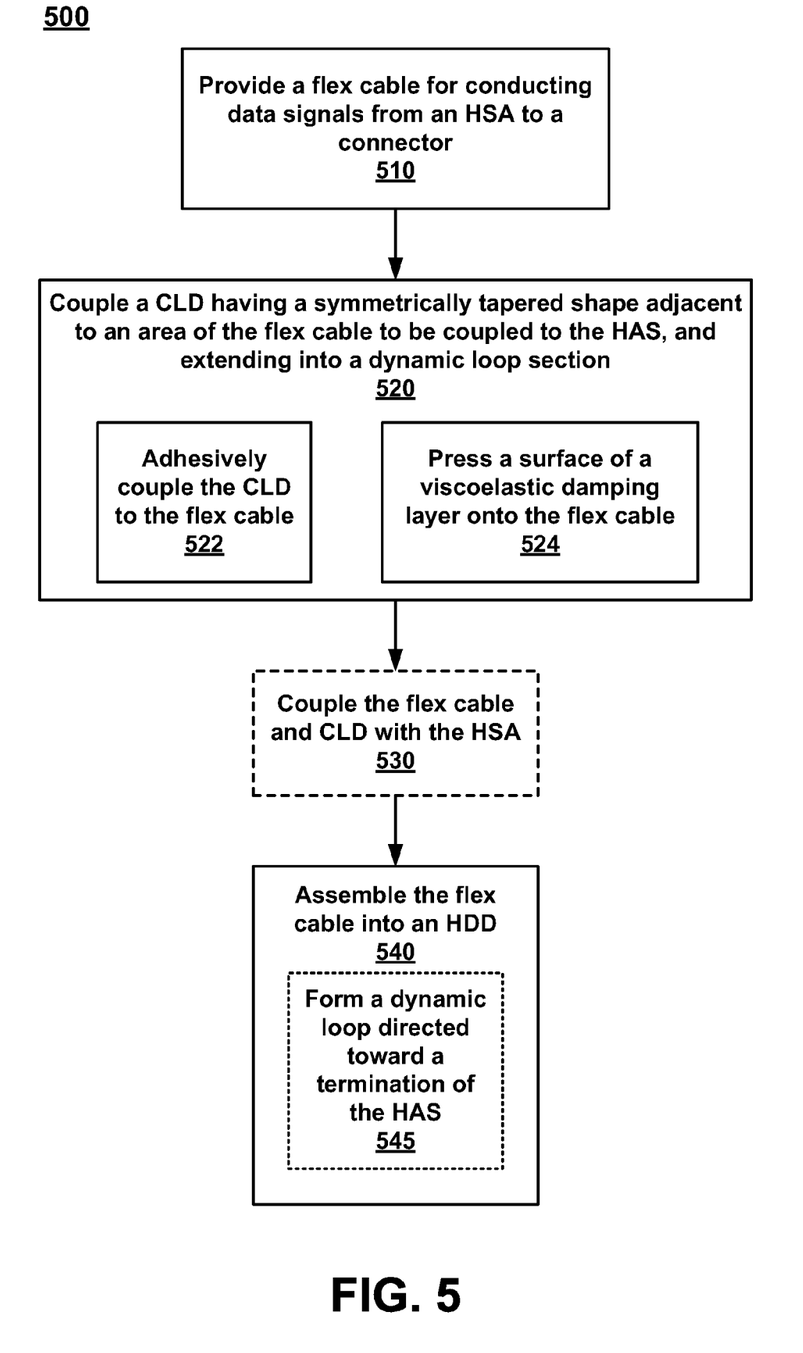
FIG. 5 is a flow chart illustrating a process for attenuating random transient vibration while reducing stress concentration of a flex cable assembly in a hard disk drive in accordance with one embodiment of the present invention.

FIG. 5 is a flow chart illustrating a process 500 for attenuating random transient vibration while reducing stress concentration of a flex cable assembly in a hard disk drive in accordance with one embodiment of the present invention. In accordance with an embodiment of the present invention, process 500 can be performed at any level of assembly, e.g. flex cable 110, flex cable assembly 250, comb assembly 200, HSA 120, and actuator 280. At which level of component or assembly that process 500 is performed depends upon the HDD designer and manufacturer and is not to limit the spirit of embodiments of the present invention.

In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 2 and FIG. 4.

In one embodiment, as shown at 510 of process 500, flex cable 110 for conducting data signals from HSA 120 to HSA connector 116 is provided. Flex cable 110 may be an individual flex cable component or coupled with an assembly such as, flex cable assembly 250, comb assembly 200, HSA 120, and actuator 280.

In one embodiment, as shown at 520 of process 500, CLD 255 having a symmetrically tapered shape is coupled with flex cable 110 such that CLD 255 is adjacent to an area of flex cable 110 operable to being coupled with HSA 120. CLD 255 is coupled with flex cable 110 such that CLD 255 extends into dynamic loop section 220. Upon assembly into HDD 100, dynamic loop section 220 will form a dynamic loop.

In one embodiment, as shown at 522 of process 500, coupling CLD 255 with flex cable 110 comprises adhesively attaching CLD 255 with flex cable 110. Some viscoelastic damping materials such as 3M Corporation's ISD-110, ISD-120, and ISD-142; and Nitto Denko Corporation's LA-50/100 are pressure sensitive adhesives and can be adhesively attached to other materials. In one embodiment, as shown at 524 of process 500, coupling CLD 255 with flex cable 110 comprises pressing a surface of viscoelastic damping layer 451 of CLD 255 onto flex cable 110.

In another embodiment, as shown at 530 of process 500, flex cable 110 is coupled with HSA 120. Coupling flex cable 110 comprising CLD 255 with HSA 120 can be accomplished by a coupler device such as coupler 230, which is integral with comb 210. In accordance with another embodiment of the present invention, coupling flex cable 110 comprising CLD 255 with HSA 120 is accomplished by a coupler device, which is a component that can be coupled with flex cable assembly 250 and/or comb 210.

In one embodiment, as shown at 540 of process 500, actuator 280 is assembled into HDD 100. In one embodiment, as shown at 545 of process 500, a dynamic loop is formed in dynamic loop section 220 of flex cable 110. The dynamic loop contains a portion of CLD 255. In one embodiment, the dynamic loop is directed toward termination 222 of HSA 120. In another embodiment the dynamic loop is formed toward VCM 142.

Having coupled CLD 255 adjacent to an area of flex cable 110, which is coupled with HSA 120, and coupled CLD 255 such that CLD 255 extends into dynamic loop section 220, upon assembly of HSA 120 into HDD 100, CLD 255 will undergo strain with motion of the dynamic loop during operation of actuator 280. The strain energy imparted into CLD 255 is dissipated as a small amount of heat and thereby attenuates random transient vibration of flex cable 110. Having coupled CLD 255 comprising a symmetrically tapered shape, stress concentration is reduced in flex cable 110 that typically results from coupling a CLD to a flex cable.

The present invention, in the various presented embodiments improves the performance and reliability of an HDD. Embodiments of the present invention provide vibration damping of an actuator that enables a magnetic transducer to settle on a prewritten data track faster and retrieve a customer's data more quickly, while reducing stress concentration in a flex cable that would typically result from coupling a CLD to the flex cable coupled with the actuator. By damping vibrations in the flex cable, and hence the actuator, with a CLD having a symmetrical tapered shape the HDD controller will not need to wait until the actuator has stopped vibrating before writing a data track. A better damped actuator allows the HDD designer to design an HDD with higher track density, since the actuator can settle more accurately on more closely spaced data tracks. The symmetrical tapered shape of the CLD reduces stress concentration in the flex cable thereby providing a more reliable flex cable and HDD.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flex cable assembly for a head stack assembly of a hard disk drive, said flex cable assembly comprising:
   a flex cable for conducting data signals from said head stack assembly to a connector, said flex cable having a dynamic loop section between a termination for said head stack assembly and said connector; and
   a constrained layer damper for attenuating random transient vibration, said constrained layer damper having a symmetrically tapered shape for reducing stress concentration, said constrained layer damper coupled with said dynamic loop section of said flex cable adjacent to an area of said flex cable configured for receiving a coupler for coupling said flex cable assembly with said head stack assembly.

2. The flex cable assembly of claim 1 wherein said constrained layer damper comprises:
   at least one constraining layer coupled with a first surface of a viscoelastic damping layer; and said flex cable coupled to a second surface of said viscoelastic damping layer, wherein said first surface is parallel to said second surface.

3. The flex cable assembly of claim 2 wherein said constraining layer is selected from the group of constraining layer materials consisting of: polyimide, UPILEX, KAPTON, polyester, and MYLAR.

4. The flex cable assembly of claim 2 wherein said viscoelastic damping layer comprises a pressure sensitive adhesive.

5. The flex cable assembly of claim 2 wherein said viscoelastic damping layer is selected from the group of viscoelastic damping materials consisting of: acrylic adhesive, LA-50/100, ISD-110, ISD-120, and ISD-142.

6. The flex cable assembly of claim 1 wherein said symmetrically tapered shape comprises two parabolic sides meeting at a cusp.

7. The flex cable assembly of claim 1 further comprising a coupler for coupling said flex cable assembly to said head stack assembly.

8. The flex cable assembly of claim 7 wherein said coupler for coupling said flex cable assembly with said head stack assembly comprises:
   a curved device, which directs said dynamic loop section toward said termination of said head stack assembly.

9. A hard disk drive comprising:
   a flex cable assembly having:
      a flex cable for conducting data signals from said head stack assembly to a connector, said flex cable having a dynamic loop section between a termination of said head stack assembly and said connector; and
   a constrained layer damper for attenuating random transient vibration, said a constrained layer damper having a symmetrically tapered shape for reducing stress concentration, said constrained layer damper coupled with said dynamic loop section of said flex cable adjacent to an area of said flex cable configured for receiving a coupler for coupling said flex cable assembly with said head stack assembly.

10. The hard disk drive of claim 9 wherein said constrained layer damper comprises:

at least one constraining layer coupled to a first surface of a viscoelastic damping layer, and said flex cable coupled to a second surface of said viscoelastic damping layer, wherein said first surface is parallel to said second surface.

11. The hard disk drive of claim 10 wherein said constraining layer is selected from the group of constraining layer materials consisting of: polyimide, UPILEX, KAPTON, polyester, and MYLAR.

12. The hard disk drive of claim 10 wherein said viscoelastic damping layer comprises a pressure sensitive adhesive.

13. The hard disk drive of claim 10 wherein said viscoelastic damping layer is selected from the group of viscoelastic damping materials consisting of: acrylic adhesive, LA-50/100, ISD-110, ISD-120, and ISD-142.

14. The hard disk drive of claim 9 wherein said symmetrically tapered shape comprises two parabolic sides meeting at a cusp.

15. The hard disk drive of claim 9 wherein said constrained layer damper is coupled with a concave surface of said dynamic loop section of said flex cable.

16. The hard disk drive of claim 9 wherein said flex cable assembly further comprises a coupler for coupling said flex cable assembly with said head stack assembly.

17. The hard disk drive of claim 9 wherein said coupler for coupling said flex cable assembly to said head stack assembly comprises a curved device, which directs said dynamic loop section toward said termination of said head stack assembly.

18. The hard disk drive of claim 9 wherein said coupler for coupling said flex cable assembly with said head stack assembly is comprised integrally within a comb.

* * * * *